United States Patent [19]
Webb

[11] Patent Number: 5,875,095
[45] Date of Patent: *Feb. 23, 1999

[54] COMPUTER HAVING A HEAT SINK STRUCTURE INCORPORATED THEREIN

[75] Inventor: Matthew L. Webb, Houston, Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,712,762.

[21] Appl. No.: 947,655

[22] Filed: Oct. 9, 1997

Related U.S. Application Data

[63] Continuation of Ser. No. 609,885, Mar. 1, 1996, Pat. No. 5,712,762.

[51] Int. Cl.$^6$ ........................................... H05K 7/20
[52] U.S. Cl. .................. 361/700; 174/15.2; 165/104.33; 361/687
[58] Field of Search .......................... 62/3.3, 3.7, 259.2; 165/80.3, 80.4, 104.33, 185, 104.19; 174/15.2, 16.3; 361/687, 689, 696, 700, 699, 701, 703–705, 707, 717–719

[56] References Cited

U.S. PATENT DOCUMENTS

| | | | |
|---|---|---|---|
| 4,503,483 | 3/1985 | Basiulis | 361/385 |
| 5,331,510 | 7/1994 | Ouchi et al. | |
| 5,339,214 | 8/1994 | Nelson | 361/695 |
| 5,383,340 | 1/1995 | Larson | 62/259.2 |
| 5,412,535 | 5/1995 | Chao et al. | |
| 5,424,913 | 6/1995 | Swindler | |
| 5,430,609 | 7/1995 | Kikinis | |
| 5,471,850 | 12/1995 | Cowans | 62/223 |
| 5,485,671 | 1/1996 | Larson | 29/840.032 |
| 5,513,070 | 4/1996 | Xie et al. | |
| 5,549,155 | 8/1996 | Meyer, IV et al. | |
| 5,559,675 | 9/1996 | Hsieh et al. | |
| 5,568,360 | 10/1996 | Penniman et al. | |
| 5,581,443 | 12/1996 | Nakamura et al. | |
| 5,588,483 | 12/1996 | Ishida | 165/86 |
| 5,598,320 | 1/1997 | Toedtman | 361/687 |
| 5,612,852 | 3/1997 | Leverault et al. | |
| 5,621,613 | 4/1997 | Haley et al. | |
| 5,646,822 | 7/1997 | Bhatia et al. | |
| 5,673,176 | 9/1997 | Penniman et al. | |
| 5,712,762 | 1/1998 | Webb | 361/687 |
| 5,734,550 | 3/1998 | Penniman | 361/687 |

*Primary Examiner*—Gerald Tolin
*Attorney, Agent, or Firm*—Konneker & Smith, P.C.

[57] ABSTRACT

A computer having a heat sink structure incorporated therein provides efficient heat dissipation for heat generating components within the computer. In a preferred embodiment, a computer has a chassis, a circuit board with a heat generating device mounted thereon, and a structural member with a heat pipe disposed thereon. The heat pipe transfers heat from the heat generating device to a heat dissipating portion of the structural member. The structural member strengthens the chassis and provides convective transfer of the heat to the environment.

15 Claims, 6 Drawing Sheets

COMPUTER HAVING A HEAT SINK STRUCTURE INCORPORATED THEREIN

This is a continuation, of application Ser. No. 08/609,885, filed Mar. 1, 1996, now U.S. Pat. No. 5,712,762.

BACKGROUND OF THE INVENTION

1. Field of the Invention

The present invention relates generally to electronic devices and, in a preferred embodiment thereof, more particularly provides a computer with a specially designed heat sink structure incorporated therein.

2. Description of Related Art

It is well known in the electronic device design art that electronic components utilized in the manufacture of, for example, computers produce heat when they are operating in the computers. It is also well known that each electronic component has a maximum operating temperature and that if an electronic component is operated at a temperature greater than its maximum operating temperature, its useful life will be curtailed. Thus, the operating temperatures of electronic components within a computer must be controlled for the computer to function properly and for the computer to have an acceptable useful life.

A common method of controlling the operating temperatures of electronic components within a computer or other electronic device is to force a stream of ambient air across the electronic components. As the air passes over the electronic components, convective heat transfer occurs between the electronic components and the air, enabling the air to carry away heat generated by the electronic components during operation thereof. Typically, the stream of ambient air is produced by a relatively flat axial fan mounted to a housing enclosing the electronic components. The housing usually has openings therethrough for circulation of the air through the housing.

The forced air heat dissipation method has several disadvantages, however. A fan consumes power which might be utilized to operate other components of the computer. In modern battery powered notebook and subnotebook computers, minimized power consumption is desirable in order to achieve an acceptable battery operating time.

A fan capable of moving a sufficient volume of air to control the temperatures of electronic components in a modern computer usually takes up a large amount of space. Typically, an axial fan utilizes approximately two cubic inches within a computer housing. In a modern notebook or subnotebook computer, space is at a premium.

A fan has reliability concerns. As with any device having moving parts, the moving parts eventually wear out and require repair or replacement. A fan is also electrically operated, typically having an electric motor for rotating a fan blade. The electric motor, electrical contacts, etc. may also need repair or replacement. Another disadvantage is that the moving and electrical parts usually produce undesirable noise.

The forced air heat dissipation method is not very efficient since, typically, the air is delivered to all electronic components within the computer housing. The result is that the gross ambient air temperature within the housing may be reduced, but a particular electronic component which produces a large amount of heat may not receive the additional air flow necessary to maintain its temperature below its maximum operating temperature. In that situation, it is usually necessary to add a finned heat sink to the electronic component, which typically must be near the electronic component, takes up a large volume within the computer housing, and decreases the overall packaging efficiency of the computer.

A further disadvantage of a fan is that it cannot be contoured to fit in available space within a computer housing. For example, a modern subnotebook computer may have a sufficient volume of unoccupied space within its housing for an axial fan to fit therein, but that volume may be distributed throughout the housing. It simply is not possible to distribute portions of the fan to different areas of the housing and have the fan operate properly.

Another solution that has been proposed for dissipating heat generated in a computer is to attach one end of a heat pipe to a heat-producing component and the other end of the pipe to a portion of the computer's metal chassis. In this way, a particular component which generates a large amount of heat may be directly cooled. This method also has disadvantages, however. A disadvantage of the method is that it relies almost exclusively on conductive heat transfer through the computer chassis to dissipate the heat. The heat is eventually transferred to the environment via convection, but since the chassis is typically disposed within a housing, if the convective heat transfer is not assisted by a forced air method, it is very inefficient.

Heat pipes are at times provided with fins at one end thereof to permit convective heat transfer therefrom. Such fins are typically soldered or brazed to the heat pipes. A disadvantage of this method is that the soldering or brazing operations can cause damage to the heat pipes which may not be discovered until the heat pipes are installed in computers, the computers are operated, and components fail due to excessive heat. Another disadvantage of this method is that the fins must be mounted to the computers' chassis, but cannot form structural portions thereof. Furthermore, the fins are subject to damage during assembly which can affect the fit of the computer and lower the effectiveness of the thermal transfer.

From the foregoing, it can be seen that it would be quite desirable to provide an efficient means of dissipating heat generated by components within a computer housing which consumes no power, takes up minimal space in the housing, makes no noise, has no moving or electrical parts, may be contoured to f it within available space in the housing, may be adapted to dissipate heat generated by particular components, does not require soldering, brazing, or similar operations, and may be a structural portion of a computer chassis. It is accordingly an object of the present invention to provide such a heat dissipation means.

SUMMARY OF THE INVENTION

In carrying out principles of the present invention, in accordance with a preferred embodiment thereof, an electronic device, representatively a computer, is provided which has a heat sink structure incorporated therein. The heat sink structure forms a structural portion of a chassis of the computer and efficiently transfers heat from an electronic component within the computer to the environment. The heat structure consumes no power, has no moving parts, and makes no noise.

In broad terms, a heat sink is provided for an electronic device, representatively a computer, of the type having a chassis and a heat generating component therein. The heat sink includes a heat absorbing portion, a conduit portion, a heat dissipating portion, a channel, and a heat pipe disposed in the channel.

The heat absorbing portion is configured for conformal attachment to the heat generating component. In a disclosed preferred embodiment, the heat absorbing portion has a plate formed thereon which is generally planar, corresponding to a generally planar heat generating component.

The conduit portion is attached to, and extends outwardly from, the heat absorbing portion. The conduit portion operatively interconnects the heat absorbing portion to the heat dissipating portion, permitting the heat dissipating portion to be remotely located relative to the heat absorbing portion.

The heat dissipating portion has a body and a series of axially spaced apart fins extending laterally outwardly from the body. The fins permit convective heat transfer from the body to the environment. The channel extends axially on a surface of the body, such that only short conductive heat transfer paths are created between the heat pipe and the fins.

The channel is continuously formed on the heat absorbing portion, the conduit portion, and the heat dissipating portion. The heat pipe is, thus, protected in the channel. A thermally conductive epoxy is utilized to secure the heat pipe in the channel.

The heat pipe is longitudinally disposed in the channel and extends from the heat absorbing portion to the heat dissipating portion. A means for thermally coupling the heat pipe to the heat generating component is utilized at the heat absorbing end of the heat pipe.

In a preferred embodiment of the invention, a computer is also provided. The computer includes a chassis, a circuit board, a heat pipe, and a structural member. The chassis has a side surface formed thereon and the side surface has a plurality of openings formed therethrough. The circuit board is attached to the chassis and has an electronic device mounted on a surface thereof. The heat pipe has opposite ends, with one of the opposite ends being thermally coupled to the electronic device.

The structural member has opposite ends, with one of the structural member opposite ends being attached to the chassis side surface. The other of the structural member opposite ends is attached to the circuit board. The structural member further has an elongated recess formed on a surface thereof, the heat pipe being received in the recess, and the heat pipe being thermally coupled to the structural member. The structural member strengthens the chassis when the structural member is attached to the chassis side surface.

DETAILED DESCRIPTION

Figure 1:
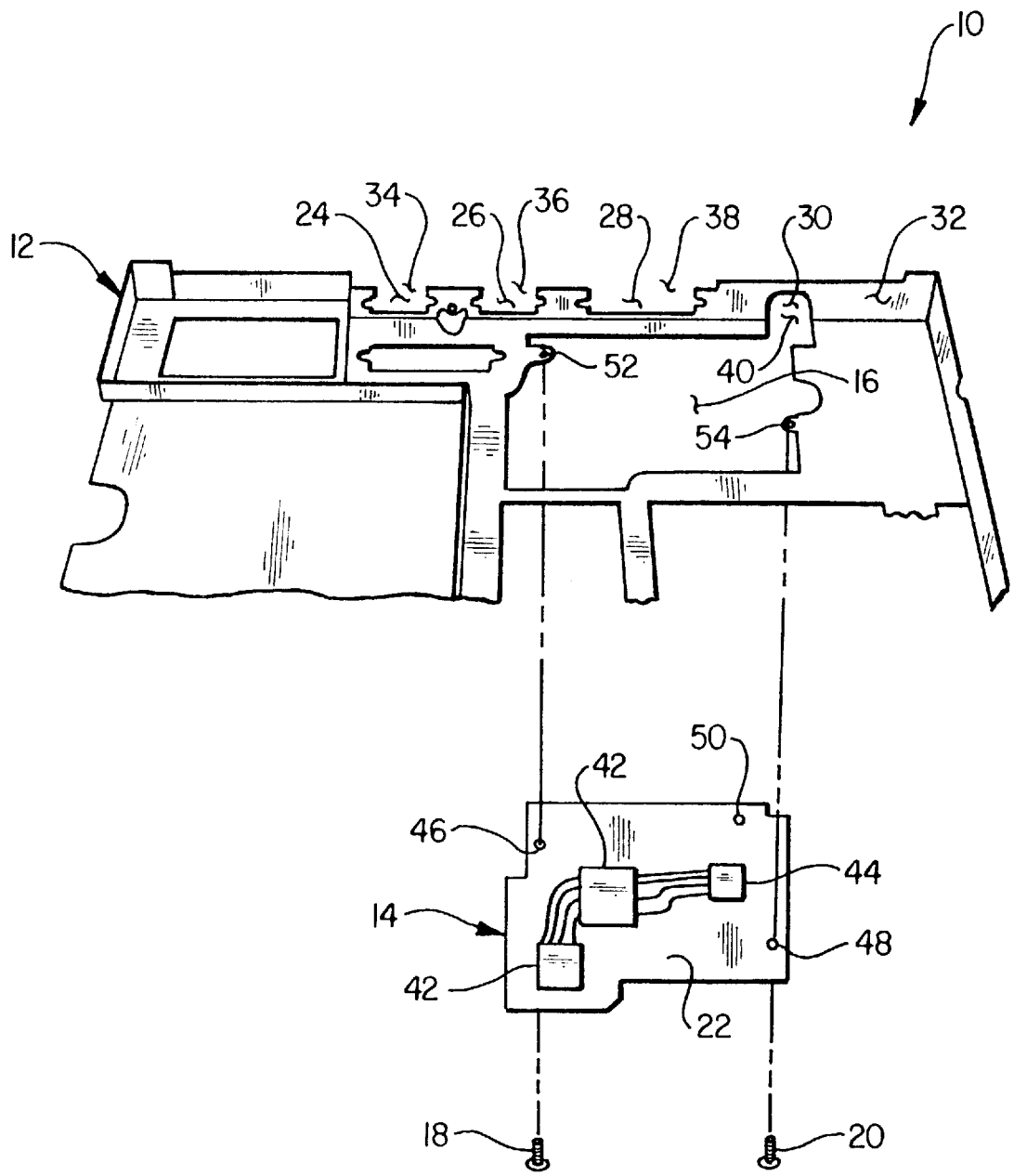
FIG. 1 is an exploded top perspective view of a computer showing a rear portion of a chassis and a printed circuit board thereof.

Representatively illustrated in FIG. 1 is an electronic device, representatively a portable notebook computer 10, including a rear portion of a chassis 12 and a printed circuit board (PCB) 14 thereof. The circuit board 14 is operatively attached to the chassis 12 in an opening 16 formed on the chassis. Fasteners, representatively screws 18 and 20, secure the PCB 14 to the chassis 12, such that an upper side 22 of the PCB faces the opening 16.

The chassis 12 has ports 24, 26, 28, and 30 formed through a rear upstanding side 32 thereof. Preferably, chassis 12 is a die-cast structure, although other methods of constructing the chassis, such as making the chassis from sheet metal, may be utilized without departing from the principles of the present invention. In the representatively illustrated chassis 12, due to system geometry constraints, each of ports 24, 26, 28, and 30, have an open side instead of being completely enclosed in the chassis. Thus, in the representatively illustrated chassis 12, ports 24, 26, and 28 are formed on the rear side 32 with open upper sides 34, 36, and 38, and port 30 is formed on the rear side with an open bottom side 40 which is integrally formed with opening 16.

It will be readily appreciated that ports 24, 26, 28, and 30, in combination with open sides 34, 36, 38, and 40, formed on rear side 32 significantly decrease the strength of the rear side of the chassis 12. In particular, the bending strength of rear side 32 is weakened. Thus, when a bending moment is applied to the rear side 32 of the chassis 12 as representatively illustrated in FIG. 1, the bending moment having an axis orthogonal to a plane defined by the rear side, the rear side will not resist bending as well as it would if open ends 34, 36, 38, and 40 were not open. The absence of material in open ends 34, 36, 38, and 40 not only permits the rear side 32 to bend easily, but may also lead to failure of the chassis 12 by fracture or plastic deformation if the bending moment is sufficiently great.

PCB 14 has multiple electronic components 42 and 44 disposed thereon. According to conventional practice, electronic components 42 and 44 may be electrically interconnected on the PCB 14 and may perform various computing functions within the computer 10. Component 44 is representatively a central processing unit which generates a large amount of heat and, thus, requires additional heat transfer therefrom in order to prevent its temperature from exceeding its maximum operating temperature. It is to be understood that component 44 may be a component other than a processor and that component 44 may be mounted to structure other than a printed circuit board without departing from the principles of the present invention.

PCB 14 has openings 46, 48, and 50 formed therethrough. Screws 18 and 20 extend through openings 46 and 48, respectively, and into openings 52 and 54 formed through the chassis 12.

Referring additionally now to FIGS. 2A–2D, a heat pipe retainer 60 embodying principles of the present invention is representatively illustrated. The heat pipe retainer 60 has an elongated finned heat dissipating portion 62, a conduit portion 64, and a heat absorbing portion 66. Preferably, retainer 60 is made of die-cast magnesium, although other materials, such as aluminum, may be utilized without departing from the principles of the present invention.

Heat absorbing portion 66 includes a generally rectangular plate 68, laterally extending stabilizing arms 70 and 72, and a laterally extending attachment arm 74. When the retainer 60 is operatively attached to the PCB 14, as described more fully hereinbelow, plate 68 overlies the processor 44 on the PCB and stabilizing arms 70 and 72 contact the surface 22 of the PCB to prevent transfer of stresses to the processor 44 and to maintain the plate 68 in a parallel spaced apart relationship with the PCB.

Openings 76, 78, and 80 formed through the attachment arm 74, conduit 64, and heat dissipating portion 62, respectively, permit securement of the retainer 60 to the chassis 12 and PCB 14. Opening 76 is threaded, permitting screw 20 to threadedly secure attachment arm 74 to the chassis 12 at opening 54 and to the PCB 14 at opening 48.

Figure 2A:
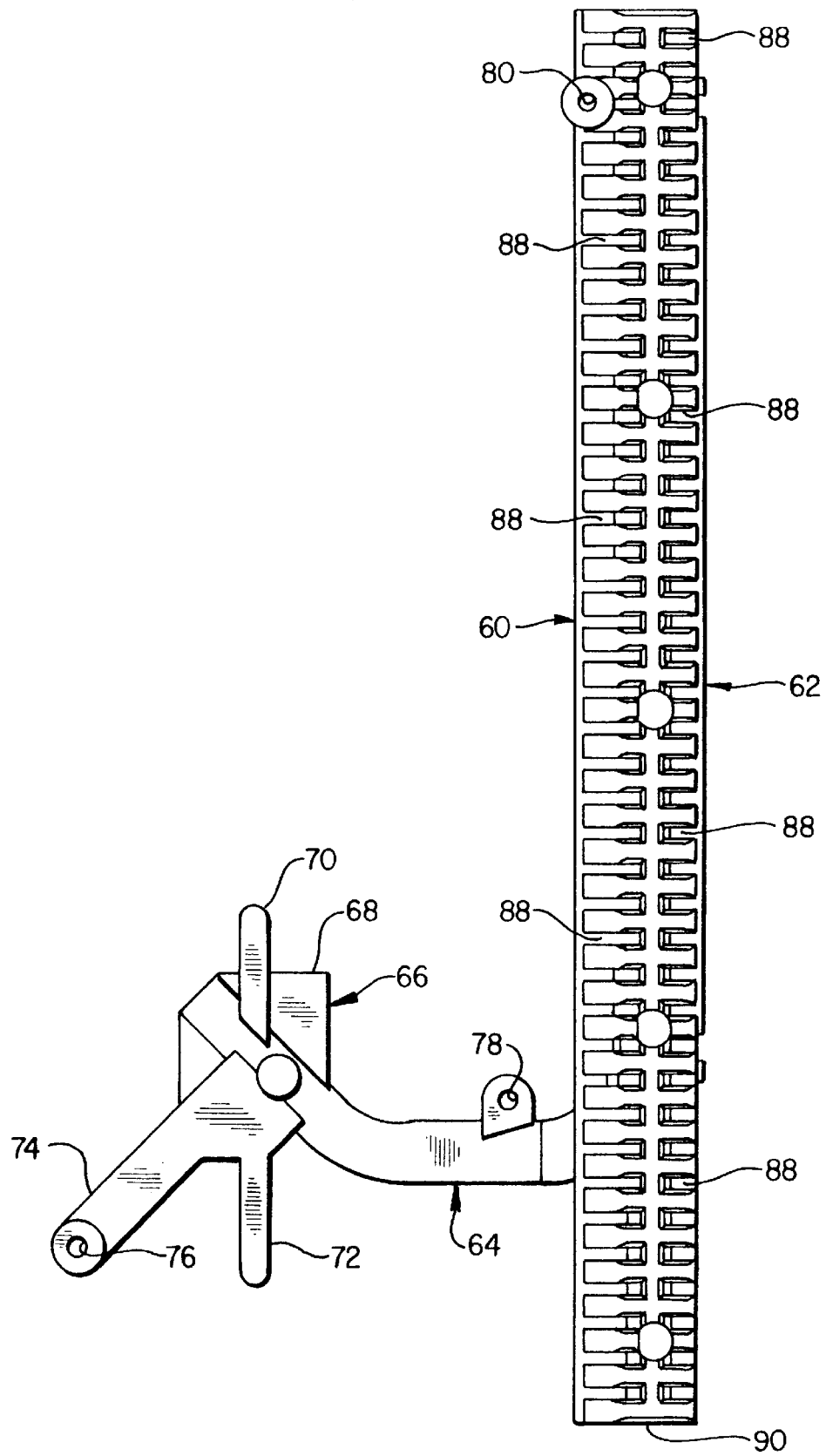
FIGS. 2A–2D are top plan, bottom plan, rear elevational and side elevational views, respectively, of a heat pipe retainer embodying principles of the present invention.
Figure 2B:
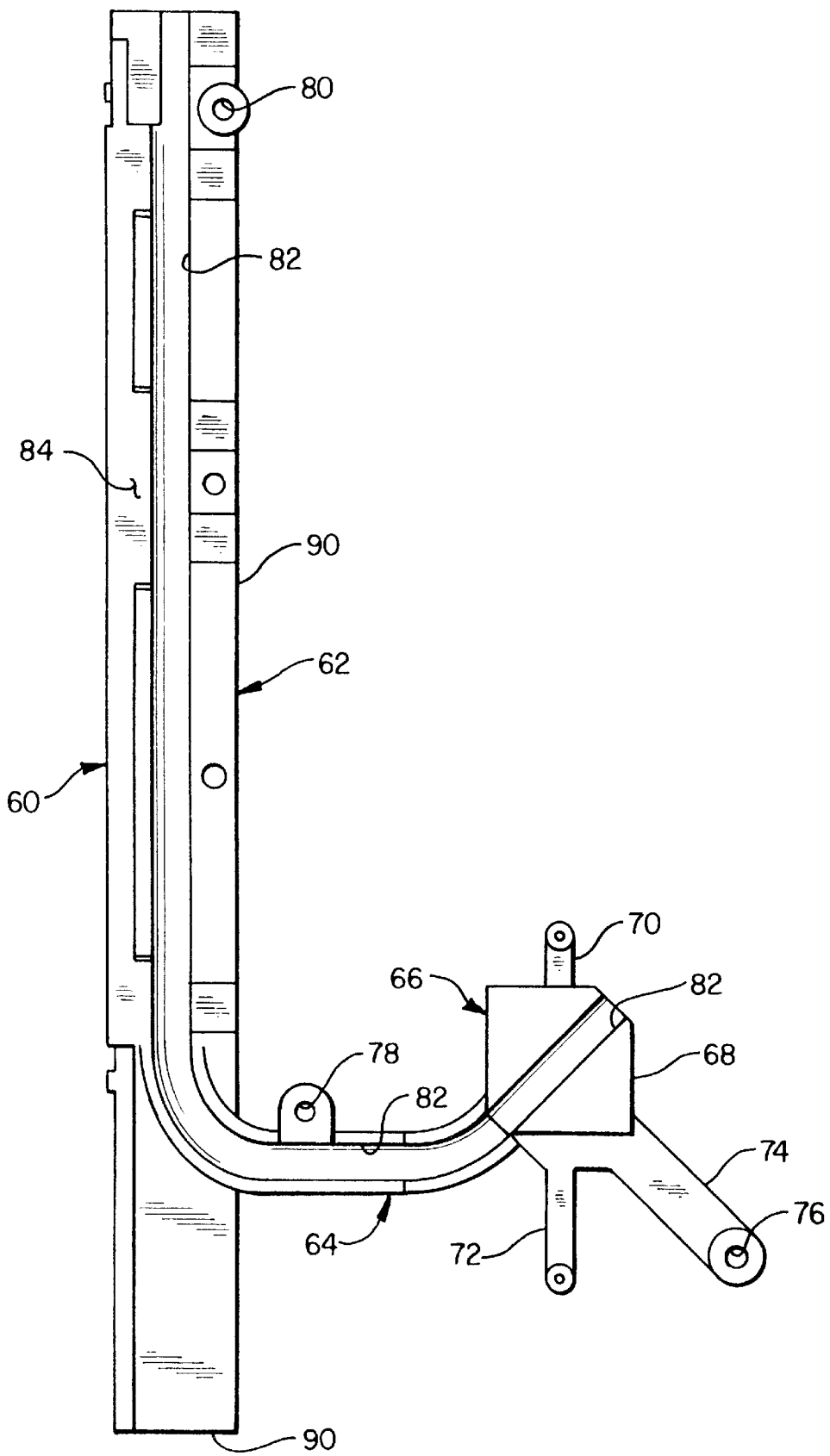

Referring specifically now to FIG. 2B, in this view a channel 82 may be clearly seen formed on the retainer 60 on a bottom side surface 84 thereof. The channel 82 conforms to the contours of the bottom side surface 84, diagonally crossing the plate 68, extending axially across the conduit portion 64, and extending axially along the heat dissipating portion 62. As will be described more fully hereinbelow, the channel 82 receives a heat pipe 86 (see FIG. 3A) therein for transfer of heat from the heat absorbing portion 66 to the heat dissipating portion 62 of the retainer 60.

It will be readily apparent to one of ordinary skill in the art that multiple channels 82 may be formed on the retainer 60 for receiving corresponding multiple portions of the heat pipe 86 therein, or for receiving multiple heat pipes therein. In this manner, the heat dissipating portion 62 may, for example, be used to dissipate heat from multiple electronic components 42, multiple heat pipes 86 may be utilized to transfer heat from a single electronic component 44, or the heat dissipating portion 62 may have multiple sections, for example, to conform to available space on the computer chassis 12, with a heat pipe transferring heat to each section of the heat dissipating portion. These modifications, and others, may be made to the retainer 60 without departing from the principles of the present invention.

Figure 2C:
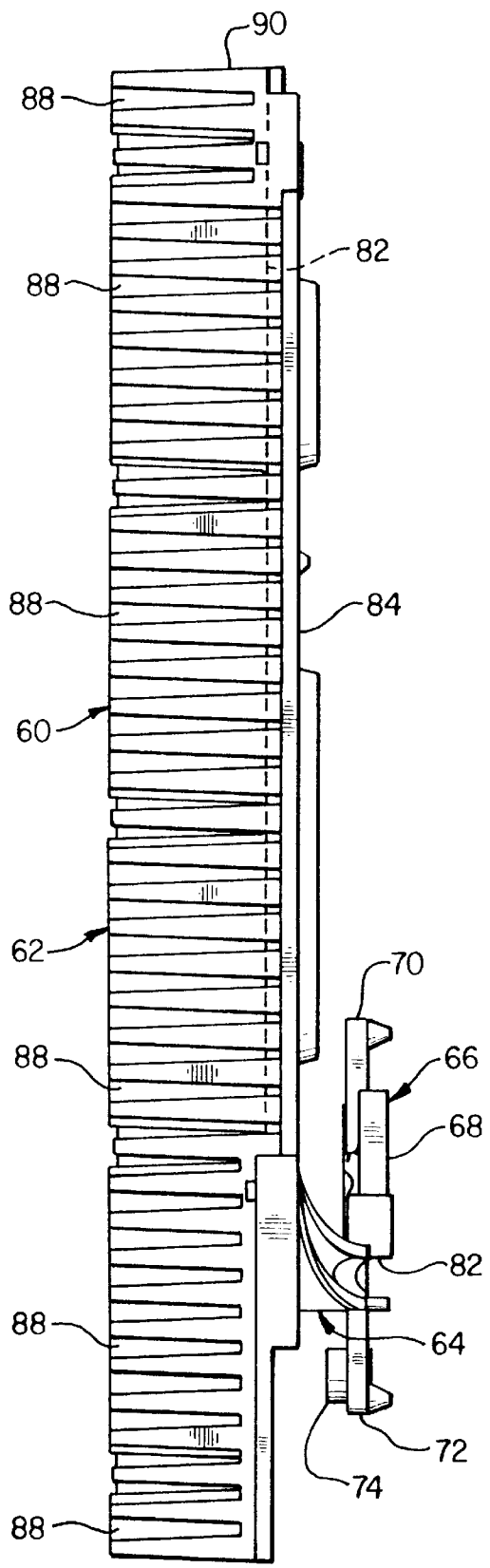

Referring specifically now to FIG. 2C, the retainer 60 may be seen from a rear elevational view thereof. In this view, the manner in which the conduit portion 64 structurally interconnects the heat absorbing portion 66 and the heat dissipating portion 62 may be clearly seen. Conduit portion 64 also permits channel 82 to be continuously formed from the heat absorbing portion 66 to the heat dissipating portion 62, allowing for lateral offsets between the heat absorbing and heat dissipating portions, changes in direction of the channel 82 as needed to conform to available space within the computer 10, etc. Additionally, as described hereinabove, conduit portion 64 has opening 78 (not visible in FIG. 2C, see FIG. 2A) formed therethrough, permitting structural attachment of the retainer 60 to the PCB 14.

In FIG. 2C, the unique configuration of the heat dissipating portion 62 may also be clearly seen. The heat dissipating portion 62 has a series of laterally extending and longitudinally spaced apart fins 88 formed thereon. The fins 88 extend outwardly from a longitudinally extending body 90 of the heat dissipating portion 62. Thus, when heat is transferred from the heat absorbing portion 66 to the heat dissipating portion 62, via the heat pipe 86 (see FIG. 3A) disposed in the channel 82, heat is transferred to the body 90 from the heat pipe by conduction, and from the fins 88 to the environment by convection. As will be readily appreciated by one of ordinary skill in the art, the unique configuration of the heat dissipating portion 62 provides very short heat conduction paths from the heat pipe 86 to the fins 88, which is desirable since heat transfer by convection is much more efficient than heat transfer by conduction.

Figure 2D:
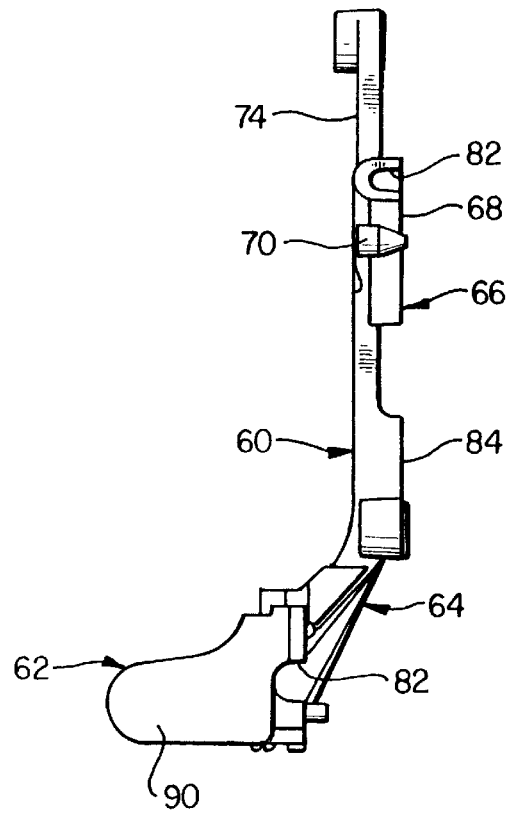

The body 90 of the heat dissipating portion 62 additionally provides a structural portion of the sis 12 as will be more fully described hereinbelow. Referring specifically now to FIG. 2D, a side elevational view of the retainer 60 may be seen. In this view it may be seen that the body 90 is relatively thick and is, therefore, capable of providing a structural portion of the chassis 12.

Figure 3A:
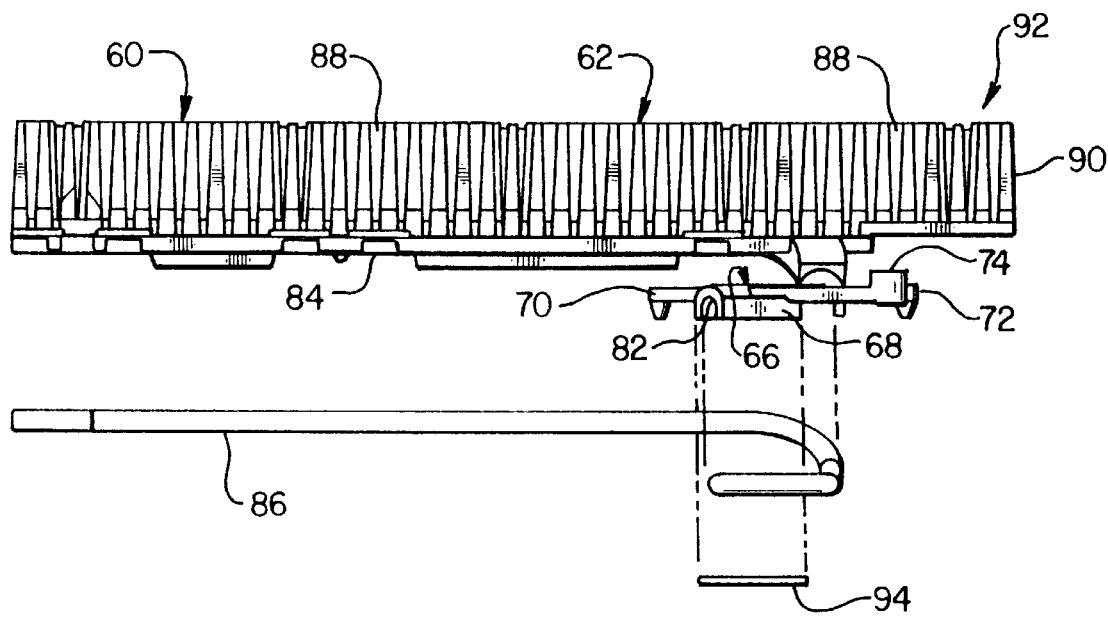
FIGS. 3A and 3B are exploded front elevational and bottom plan views, respectively, of a heat sink assembly incorporating the heat pipe retainer of FIGS. 2A–2D, the heat sink assembly embodying principles of the present invention.
Figure 3B:
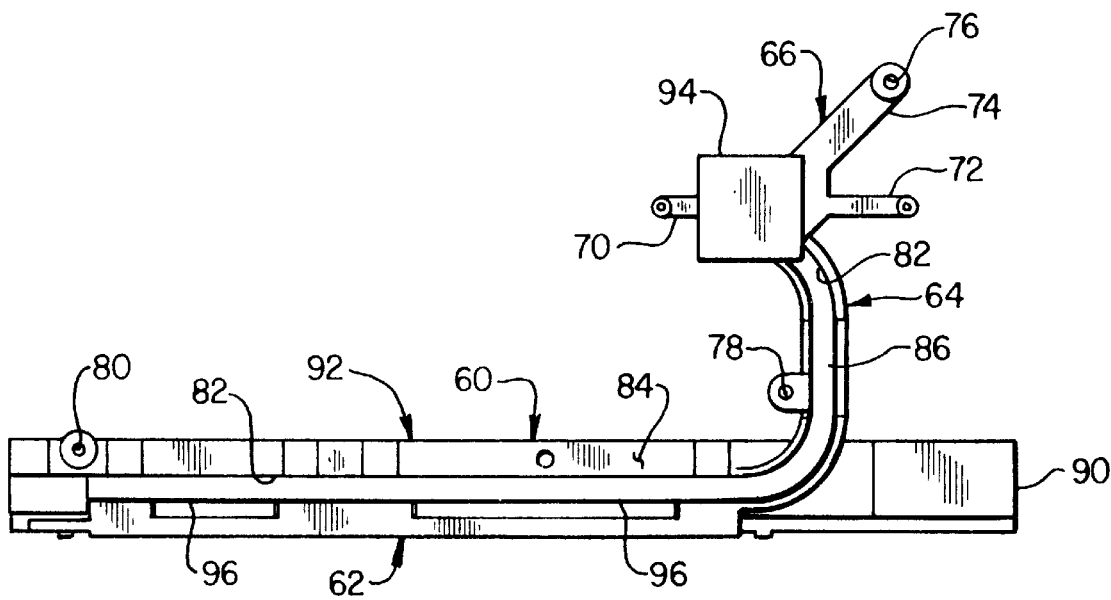

Referring additionally now to FIGS. 3A and 3B, a heat sink assembly 92 may be seen. The heat sink assembly 92 includes the heat pipe retainer 60, the heat pipe 86, and an elastomeric heat transfer pad 94. The heat pipe 86 is received in the channel 82 formed on the bottom side surface 84 and, thus, the heat pipe is formed such that it conforms to the contours of the channel.

Figure 4:
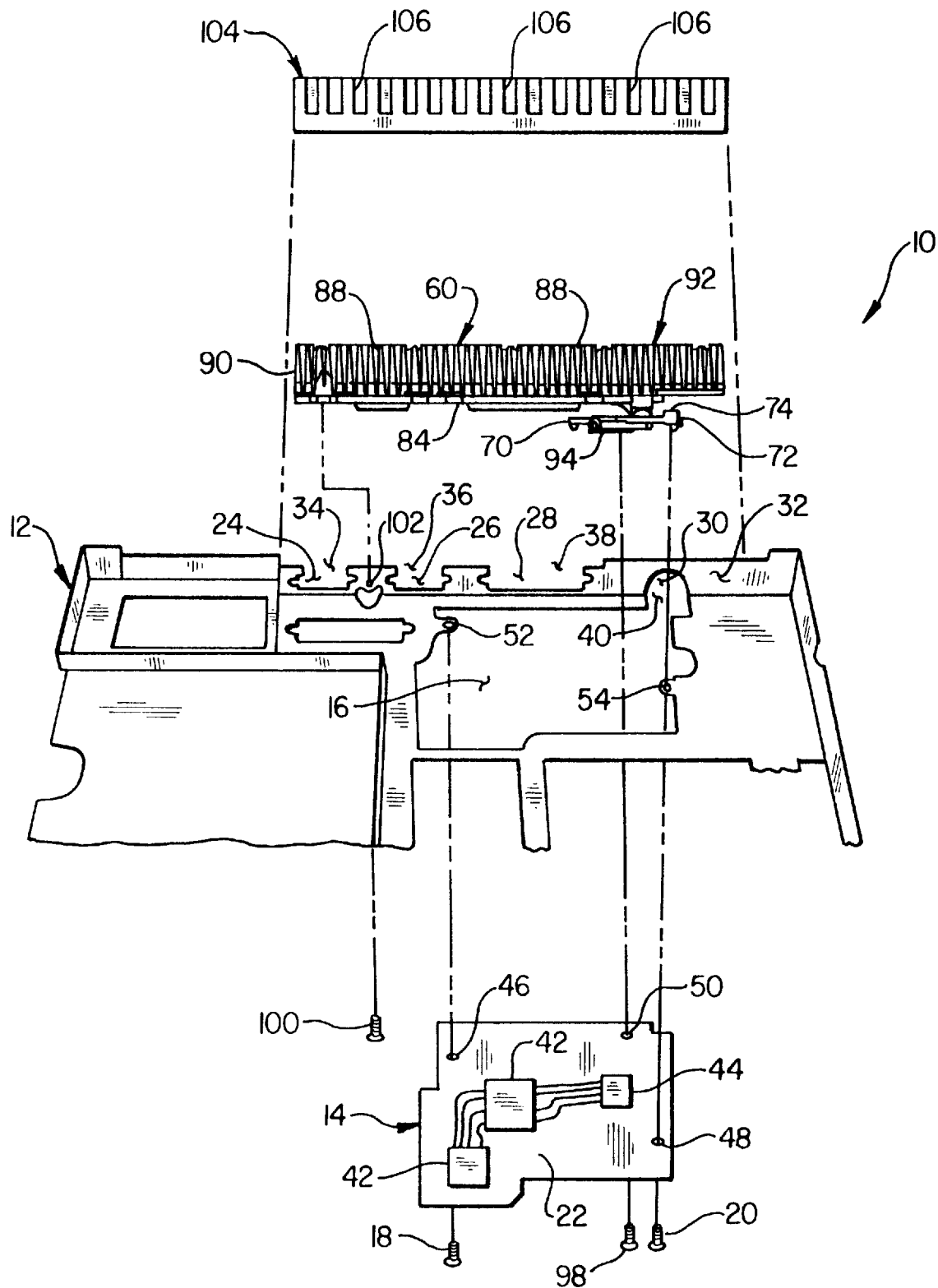
FIG. 4 is a top perspective view of the computer of FIG. 1 incorporating the heat sink assembly of FIGS. 3A and 3B therein.

The heat transfer pad 94 provides an interface between the plate 68 and the processor 44 (see FIG. 4). Preferably, the pad 94 is made of a T-pli 230A material available from Thermagon, Inc. of Cleveland, Ohio, but it is to be understood that other materials may be utilized for the pad 94 without departing from the principles of the present invention. Pad 94 permits conductive transfer of heat from the processor 44 (or any other heat-producing component to which it is attached) to the plate 68 and heat pipe 86 and permits pliable attachment of the heat absorbing portion 66 to the processor 44 to prevent damage thereto.

The heat pipe 86 is preferably of the type manufactured by Thermacorel Inc. of Lancaster, Pa., but it is to be understood that other heat transfer devices may be utilized without departing from the principles of the present invention. Heat pipe 86 permits efficient transfer of heat absorbed at the heat absorbing portion 66 to the heat dissipating portion 62, permits distribution of the heat so transferred longitudinally along the heat dissipating portion 62, and permits such transfer of heat to conform to available space within the computer 10.

Heat pipe 86 is preferably secured to the retainer 60 in the channel 82 by a thermally conductive epoxy 96, such as Epo-Tek H67-MP available from Epoxy Technology, Inc. of Billerica, Mass., although other adhesives or fasteners may be utilized to secure the heat pipe 86 without departing from the principles of the present invention. Epoxy 96 provides an extended thermally conductive interface between the heat pipe 86 and the retainer 60 substantially along the entire length of the heat pipe. Thus, in heat sink assembly 92, epoxy 96 aids in minimizing lengths of conductive heat transfer paths in the retainer 60 and heat pipe 86.

Referring additionally now to FIG. 4, an exploded view of the computer 10 is shown. Screw 20 secures the PCB 14 at opening 48 to the chassis 12 at opening 54, and to the attachment arm 74 at threaded opening 76. Screw 18 secures the PCB 14 at opening 46 to the chassis 12 at threaded opening 52. The PCB 14 is thus disposed on the chassis 12 with upper side 22 facing opening 16 on the chassis.

A fastener, representatively screw 98, secures the PCB 14 at opening 50 to the heat sink assembly 92 at threaded opening 78 (see FIG. 2B). With the heat sink assembly 92 thus secured to the PCB 14, the heat transfer pad 94 is in contact with the processor 44. Note that screws 98 and 20 are straddling the processor 44. In this manner, the pressure applied to the processor 44 by screws 98 and 20 is evenly distributed across the surface of the processor. Note, also, that when the screws 98 and 20 secure the PCB 14 to the heat sink assembly 92, the stabilizing arms 70 and 72 straddle the processor 44 and are in contact with the PCB surface 22, preventing deflection of the plate 68 relative to the processor, which deflection may impart possibly damaging localized stresses to the processor.

A fastener, representatively screw 100, secures the heat sink assembly 92 at threaded opening 80 (see FIG. 2B) to the chassis 12 at an opening 102 formed upwardly through the rear side 32 of the chassis. In this manner, the heat sink assembly 92 provides structural support for the rear side 32 of the chassis 12, bridging the open sides 36 and 38 of ports 26 and 28. It is to be understood that, properly modified, heat sink assembly 92 may also bridge open sides 34 and 40 of ports 24 and 30, without departing from the principles of the present invention. It will be readily appreciated by one having ordinary skill in the art that such bridging of open sides 36 and 38 substantially increases the strength of the rear side 32 of the chassis 12. It may now be fully appreciated that body 90 of the heat pipe retainer 60 becomes a structural component of the chassis 12 when the heat sink assembly 92 is secured to the chassis.

The heat sink assembly 92 is covered with a shroud 104 after it is secured to the PCB 14 and chassis 12. Shroud 104 has longitudinally spaced apart openings 106 formed therethrough and is preferably made of a plastic material, although other material, such as sheet metal, may be utilized without departing from the principles of the present invention. Openings 106 permit air to circulate about the fins 88 on the heat dissipating portion 62 and otherwise provide ventilation for components in the computer 10. This permits heat transfer by convection to be maximized in the computer 10.

Thus has been described a computer 10 having a heat sink assembly 92 incorporated therein which efficiently dissipates heat generated by a processor 44 within the computer. The heat sink assembly 92 consumes no power, takes up minimal space within the computer 10, makes no noise, has no moving or electrical parts, may be contoured to fit within available space in the computer, may be adapted to dissipate heat from multiple components or particular components, does not require soldering or brazing of the heat pipe 86, and is a structural portion of the chassis 12.

The foregoing detailed description is to be clearly understood as being given by way of illustration and example only, the spirit and scope of the present invention being limited solely by the appended claims.

What is claimed is:

1. A computing apparatus, comprising:

a housing;

a heat generating component disposed within the housing;

a heat pipe; and a heat pipe retainer in said housing including a heat absorbing portion contacting the heat generating component, a conduit portion, and a heat dissipating portion, the heat pipe being disposed in a continuous channel of the retainer extending from the heat absorbing portion, across the conduit portion, and to the heat dissipating portion, the conduit portion being at least partially spaced apart from the housing.

2. The apparatus according to claim 1, wherein the heat absorbing portion is adapted for conformal attachment to the heat producing component.

3. The apparatus according to claim 2, wherein the heat absorbing portion includes at least one laterally extending stabilizing portion.

4. The apparatus according to claim 3, wherein the stabilizing portion contacts a structure of the computing apparatus to which the heat producing component is attached, the stabilizing portion thereby preventing transfer of stress from the heat pipe retainer to the heat producing component.

5. The apparatus according to claim 1, wherein the conduit portion includes an attachment portion, the attachment portion securing the heat pipe retainer to a structure of the computing apparatus to which the heat producing component is attached.

6. The apparatus according to claim 1, further comprising a thermally conductive interface disposed between the heat pipe and the channel.

7. The apparatus according to claim 6, wherein the thermally conductive interface is an epoxy material.

8. The apparatus according to claim 1, further comprising a thermally conductive interface in contact with the heat absorbing portion.

9. The apparatus according to claim 8, wherein the thermally conductive interface is a heat transfer pad.

10. The apparatus according to claim 1, wherein the heat dissipating portion includes a longitudinally extending body on which the channel is formed.

11. The apparatus according to claim 10, further comprising a chassis, and wherein the body forms a structural member of the chassis.

12. The apparatus according to claim 11, wherein the chassis includes an opening formed therethrough, the opening having an open side, and wherein the body is attached across the open side of the opening.

13. The apparatus according to claim 10, wherein the heat dissipating portion further includes a series of fins attached to the body.

14. The apparatus according to claim 13, wherein the fins are formed on the body.

15. The apparatus according to claim 13, wherein the fins are longitudinally spaced apart on the body.

* * * * *